Figure 1:
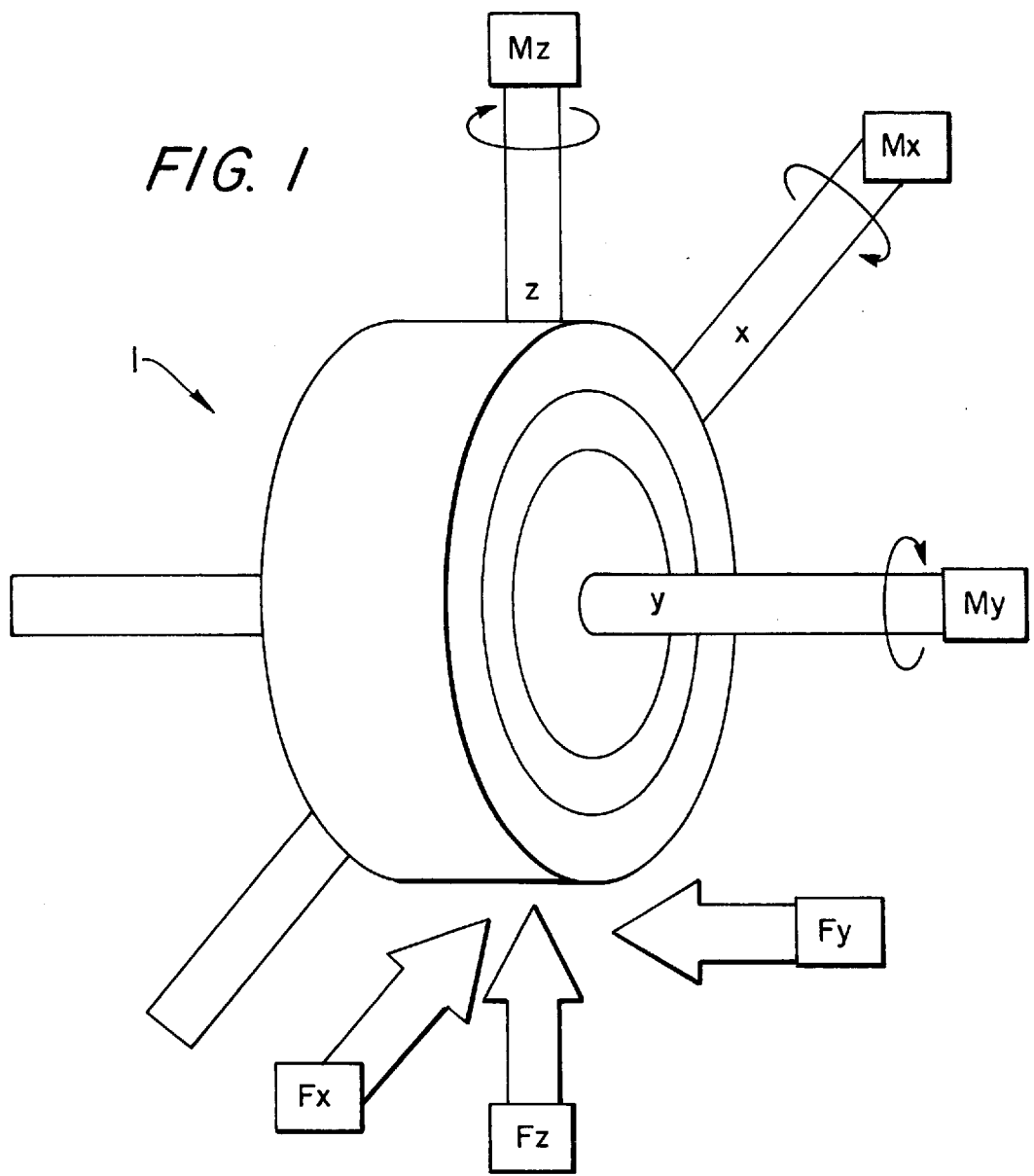

United States Patent

Beste et al.

[11] Patent Number: 5,827,956
[45] Date of Patent: Oct. 27, 1998

[54] FORCE MEASURING WHEEL FOR VEHICLES

[75] Inventors: Andreas Beste, Gaimersheim; Josef Vogler, Ingolstadt; Frank Hailer, Calw; Manfred Muller, Leonberg; Werner Aicher, Stuttgart, all of Germany

[73] Assignee: Audi AG, Ingolstadt, Germany

[21] Appl. No.: 545,617

[22] PCT Filed: Mar. 22, 1994

[86] PCT No.: PCT/EP94/00886

§ 371 Date: Oct. 10, 1995

§ 102(e) Date: Oct. 10, 1995

[87] PCT Pub. No.: WO94/24535

PCT Pub. Date: Oct. 27, 1994

[30] Foreign Application Priority Data

Apr. 10, 1993 [DE] Germany .......................... 43 11 903.4

[51] Int. Cl.⁶ ................................. E01C 23/00; G01L 1/04
[52] U.S. Cl. ........................................ 73/146; 73/862.629
[58] Field of Search ................................. 73/146, 146.5, 73/862.04, 862.05, 862.629, 862.631, 862.632, 862.634

[56] References Cited

U.S. PATENT DOCUMENTS

| 4,046,005 | 9/1977 | Goroski . |
| 4,448,083 | 5/1984 | Hayashi ............................... 73/862.04 |
| 4,493,220 | 1/1985 | Carignan et al. . |
| 5,016,470 | 5/1991 | Himmler .................................... 73/146 |
| 5,193,387 | 3/1993 | Hodate ................................... 73/146.5 |
| 5,235,850 | 8/1993 | Schurmann ............................ 73/146.5 |

FOREIGN PATENT DOCUMENTS

| 364356 | 4/1990 | European Pat. Off. . |
| 0364356 B1 | 5/1994 | European Pat. Off. . |
| 2580550 | 4/1985 | France . |
| 1773870 | 1/1972 | Germany . |
| 2104003 | 7/1973 | Germany . |
| 2214223 | 8/1973 | Germany . |
| 2917967 | 12/1982 | Germany . |
| 2708484 | 7/1983 | Germany . |
| 2303936 | 10/1983 | Germany . |
| 2917966 | 10/1983 | Germany . |
| 3345638 | 12/1983 | Germany . |
| 3336542 | 4/1985 | Germany . |
| 8700180 | 8/1987 | Germany . |
| 8712263 | 12/1987 | Germany . |
| 3636339 | 5/1988 | Germany . |
| 0282008 | 9/1988 | Germany . |

(List continued on next page.)

OTHER PUBLICATIONS

Berichte Nr. 632, 1987, Mehrkomponenten–Messnaben zur Erfassung von Radkraften—Vergleich verschiedener Konstruktionsprinzipien, Dipl.–Ing. G. Weiger und Dipl.–Ing. D. Dorrie, Stuttgart.

180 ATZ Automobiltechnische Zeitschrift 94(1992) Jan., No. 1, Stuttgart, DE / Mehrkomponenten–Radmessnabe, Einsatzmoglichkeiten und Ergebnisse; by Von Rolf Loh und Friedrich W. Nohl.

Einsatz Piezoelektrischer Mehrkomponenten–Kraftaufnehmer; by zur Erfassung von Radkraften und—momenten.

Primary Examiner—Richard Chilcot
Assistant Examiner—William L. Oen
Attorney, Agent, or Firm—Lalos & Keegan

[57] ABSTRACT

A measuring wheel detects forces and moments between the rim and axle of a vehicle wheel with measuring sensors between the rim face and a wheel flange apparatus transmits the energy and data to a measurement evaluation and processing system on the vehicle. The wheel flange and/or the front of the rim consists of a fiber compound, while the apparatus on the wheel for transmitting energy and data are fitted on the inside of the rim bed holding the vehicle tire and extends essentially over its circumference. Thus the static properties and dynamic behavior of the measuring wheel during travel correspond to the greatest degree to the original wheel. Effects which falsify the measurements such as increased wheel weight and the like do not arise.

14 Claims, 3 Drawing Sheets

FOREIGN PATENT DOCUMENTS

| | | |
|---|---|---|
| 0307634 | 3/1989 | Germany . |
| 0352788 | 1/1990 | Germany . |
| 3934626 | 4/1991 | Germany . |
| 3937403 | 5/1991 | Germany . |
| 3937966 | 5/1991 | Germany . |
| 4007797 | 5/1991 | Germany . |
| 4033052 | 10/1992 | Germany . |
| 57-118132 | 5/1956 | Japan . |
| 52-133270 | 8/1977 | Japan . |
| 2039063 | 7/1980 | United Kingdom . |
| 2189615 | 4/1987 | United Kingdom . |

FORCE MEASURING WHEEL FOR VEHICLES

The invention relates to a measuring wheel for detection of forces and moments between the rim and axle of a vehicle tire.

Operational stability tests and studies of vehicle movement dynamics represent essential elements in the development of vehicles, in particular in connection with safety-relevant functional groups, which include vehicle wheels and the chassis in which they are housed.

The studies in question are conducted on load test stands and in a vehicle. The prerequisite is that the forces occurring during driving be determined in a driving test.

Measuring wheels are employed for such a multicomponent power measurement at a rotating wheel. The power flux is guided through suitable measuring elements at an interface in the measuring wheel. Spring elements with measuring extension strips (DMS) or quartz sensors are commonly used for this purpose. The test values obtained are converted online or offline from the rotating coordinate system of the wheel to the coordinate system of the vehicle. It is also necessary for this purpose to determine the angular position of the wheel.

Exemplary embodiments of such measuring wheels and test execution details are presented, for example, in the report entitled "Multicomponent measuring hubs, potential applications, and results" and published in ATZ Automobiltechnische Zeitschrift 94 (1992), pages 44 to 53. The multicomponent wheel hub shown in detail as an example on page 45 consists of a modified rim, a wheel flange, a measuring sensor, and an electronic component. The measuring sensor performs the function of sensing dynamic forces and moments. The DMS applications necessary for determining these forces are executed on a specially designed aluminum component. The electronic component includes a constant-voltage amplifier for each measured quantity, a slip ring rotation transducer, and a resolver for determination of the wheel position (angle of rotation of the wheel about the Y axis).

A measuring wheel such as this presents the major disadvantage that neither statically nor dynamically does it correspond to an original wheel subsequently installed on the vehicle. The design of the test equipment considerably increases the weight of the wheel, and also the components projecting a relatively great distance forward (slip ring rotation transducer, resolver) exert an additional effect of moment during driving and create a hazard in public road traffic; these considerations make measurement during operation by customers impossible or at least extremely difficult. And so a description is given on page 46, Section 2.2, of this reference of the attempt made to compensate for these factors which distort the results.

While a modified multicomponent wheel measurement hub is described on page 53 in FIG. 24 (where the resolver is replaced by an incremental transmitter, the slip ring rotation transmitter by an infrared telemetry strip, and the power supply of the electronic component is inductive), one in which the total width of the measuring system was reduced, only to a certain extent have the disadvantages discussed above been eliminated.

In the light of what has been stated the object of the invention is to develop the state-of-the-art measuring wheel so that this wheel will correspond to the original wheel to the greatest extent possible with respect to its static properties and its dynamic behavior.

DE 39 37 966 A1 discloses the mounting of a part of a measurement signal transmitter on the inside of a wheel rim in order to correspond with a signal receiver on the body side by way of the pertinent transmitter, signal transmission being accomplished free of contact, as for example by inductance with a frequency-modulated signal or by way of slip rings. Of course, this prepublication describes not a measuring wheel but rather a process and a device for determination of the closed linkage relationships between vehicle tire and roadway, for which purpose at least one sensor is mounted in the tire tread to detect the patterns of local voltages, expansions, or strains in the horizontal and vertical directions. Both the current closed linkage coefficient and the maximum possible closed linkage coefficient between the vehicle tire and the roadway can thus be determined.

Figure 3:
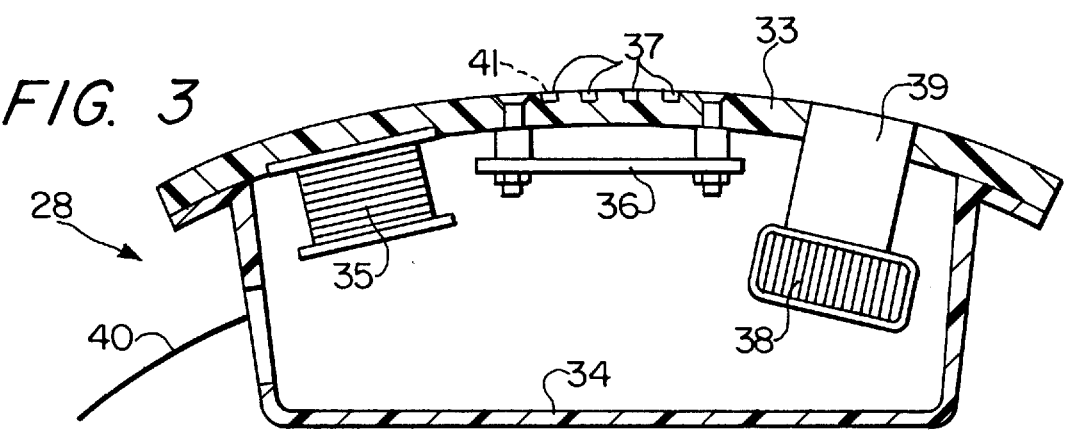

A preferred development is described in what follows. In the accompanying drawings, FIG. 1 shows a wheel of a motor vehicle, together with the forces and moments arising during driving, FIG. 2 a diagram of the cross-section of the measuring wheel claimed for the invention along arrow II in FIG. 4, FIG. 3 a side view of the associated stator fastened on the wheel axis (shock strut), and FIG. 4 a view of the measuring wheel along arrow IV in FIG. 2.

Forces $F_X$, $F_Y$, $F_Z$ acting in the directions indicated by arrows and moments $M_X$, $M_Y$, and $M_Z$ acting around the X-, Y-, and Z- axes as shown in Figure occur on each wheel 1 during driving.

Figure 2:
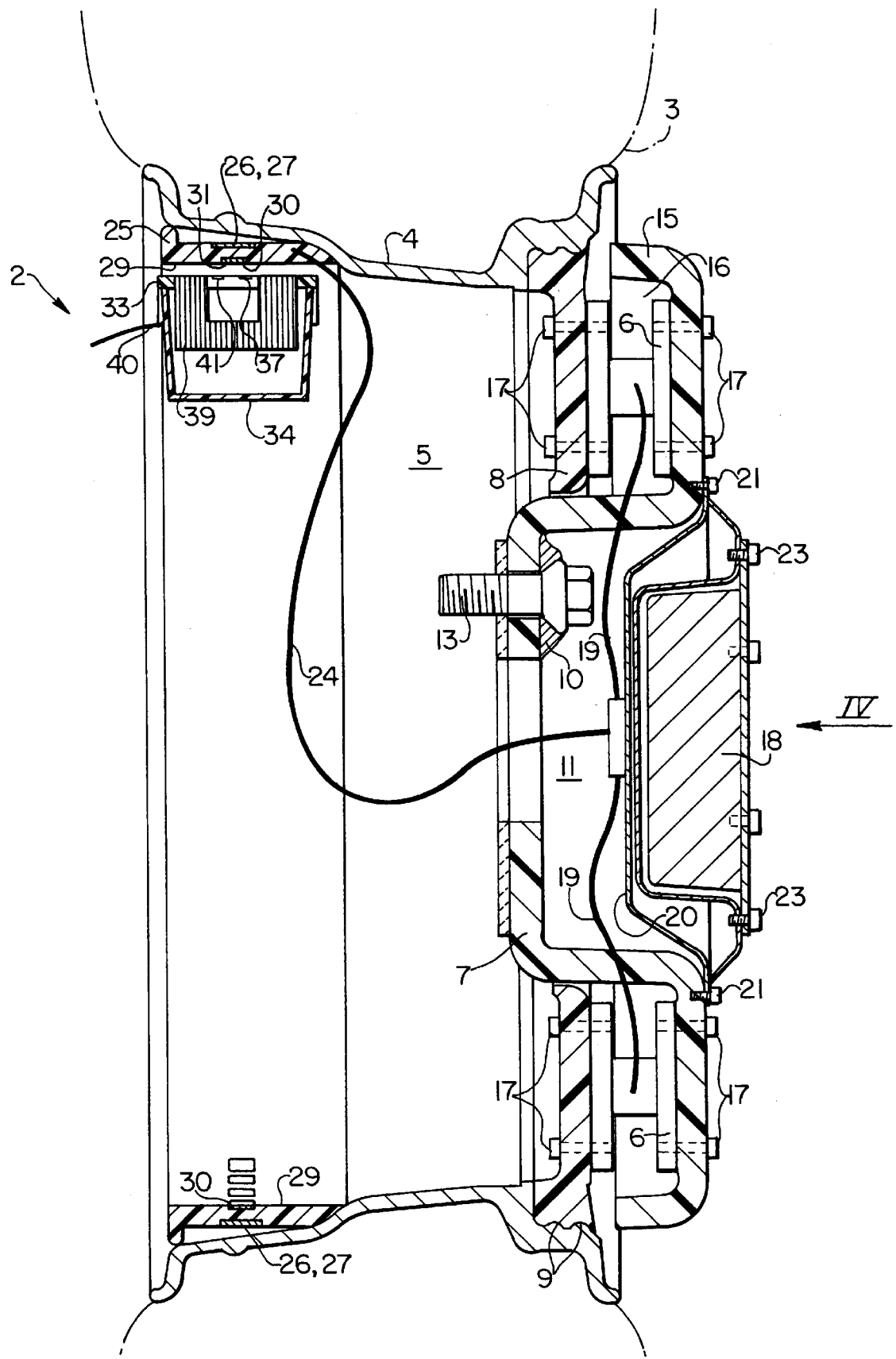
Figure 4:
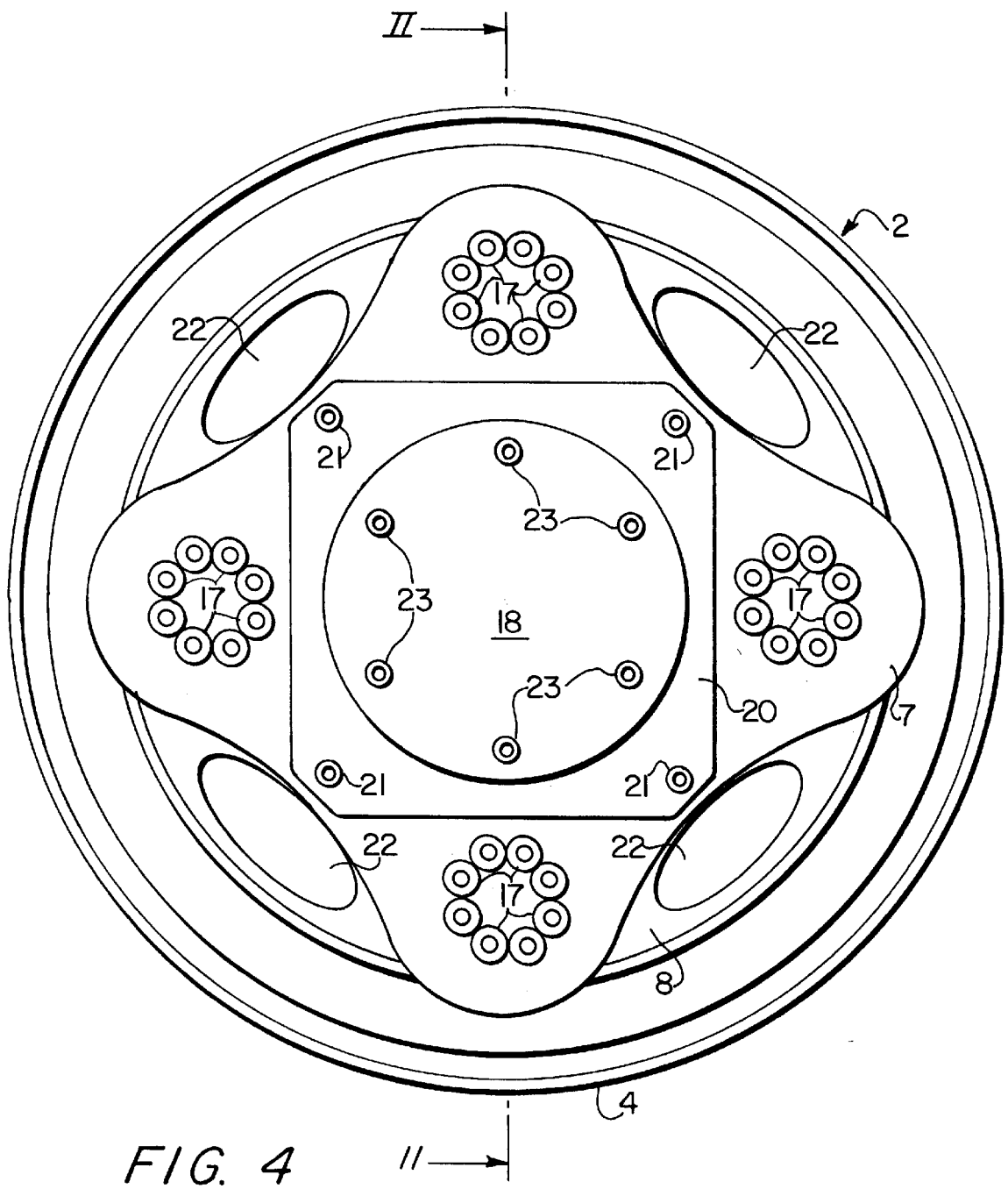

The measuring wheel 2 illustrated in FIGS. 2 and 4 performs the function of determining these three external forces and moments referred to the wheel contact point. A tire 3, represented by broken lines, is mounted by a state-of-the-art method in a well 4 consisting, for example, of an aluminum alloy, of a rim 5. A face of the rim 8 connected to the rim well 4 and joined to a wheel flange 7 by way of transducer (DMS force transducers 6) consists, as does the cupshaped wheel flange 7 formed in the central inner part, of a fiber reinforced material (CFK=carbon fiber reinforced plastic). If desired, it might be sufficient, for the desired reduction of the weight of the measuring wheel 2, for the sake of optimizing the static and dynamic properties, to produce only one of the two components (wheel flange 7, rim face 8) of a fiber reinforced material and the other, as is customary, of metal.

The connection between rim well 4 and rim face 8 is made by producing the fiber reinforced material in the previously sand blasted rim well 4. The connection thus has the effect of a large-area glued joint (adhesion forces). In addition, the rim well is worked prior to the sand blasting (ribs 9) so that a positive connection is established which secures the connected parts against axial and radial displacements. Lastly, the age hardening of the rim face 8 is controlled so that the rim well 4 is subjected to tensile prestressing. Since the fiber reinforced material CFK employed has a high E modulus (approximately 100,000 N/mm$^2$), the rim 5 as a whole possesses a rigidity corresponding to that of a mass-produced rim.

The wheel flange 7 is connected by screws 13 seated on titanium bases 10 to the wheel axle not shown here. An additional inserted washer 14, for example, one of a polyimide or ceramic material, provides a certain amount of thermal insulation from heat passing into the measurement system to be explained below, for example, during braking processes.

If the wheel flange 7 is in the square form shown in FIG. 4, with lateral edges curving inward, openings 22 made in these areas in the rim face 8 can effect additional heat removal outward.

Four DMS force transducers 6 are spaced evenly over the circumference as transducers, between rim face 8 and wheel flange 7, inside a cavity 16 formed by the outline (central cup 11, bevelled edge 15) of the wheel flange 7, and are connected to the wheel flange 7 or the rim face 8 by means of screw connections 17. Depending on the size of the measuring wheel 2, a larger number of force transducers 6 may, of course, be employed, but there must be a minimum of three. As a result of the structure of the transducers, both static and dynamic test signals can be detected accurately. Consequently, both the individual integrated analyzers and the measuring wheel 2 as a whole can be statically calibrated with high accuracy. Each of the four DMS force transducers is of state-of-the-art design and generates three signals corresponding to the forces arising in it, $F_X$, $F_Y$, and $F_Z$. Initial signal processing can be accomplished in the force transducer 6 itself by electronic boards installed in them, ones which among other things perform the function of signal preamplification and crosstalk compensation. The signals reaching an electronic unit 18 introduced into the central cup 11 over cables 19 from the force transducers 6 are consequently already preamplified to the extent that the influence of noise fields from the electronic equipment of the vehicle is eliminated.

Other noise signals could be generated by additional stresses on the force transducers 6 distorting the measured values, ones caused by temperature rises due to repeated braking and the resulting thermal expansion of wheel flange 7 and rim face 8. In this respect as well the material selected naturally exerts a highly positive effect for wheel flange 7 and rim face 8, since the fiber reinforced material CFK is characterized by very low thermal expansion (significantly lower than that of steel or aluminum).

The twelve force signals (from four force transducers 6 each generating three force signals $F_X$, $F_Y$, and $F_Z$) move, by way of a jack mount 20 extending into the central cup 11 of the wheel flange 7 and fastened on the wheel flange 7 by means of screws 21 (see FIG. 4), into the electronic unit 18 held by the jack mount 20 (screw connections 23), the electronic unit 18 being mounted on the jacks provided for this purpose in the jack mount 20.

The total forces and total moments are made up of the individual forces by a state-of-the-art process in the electronic unit 18. These signals are digitized along with a signal from a temperature sensor which should be mounted in an area of the measuring wheel 2 subjected to thermal loads, for example, by braking processes, and a voltage monitoring signal. These data are converted to a serial PCM (pulse code modulation) data stream and sent after frequency modulation over cables 24 to a coil and magnet ring 25 of glass fiber reinforced plastic cemented on the inside of the rim well 4. The coil and magnet ring 25 serves as receptacle for integrated data transmission and energy reception coils 26, 27, and in addition has, on its inner side 29 facing a stator 28 mounted on the side of the vehicle, a magnetic track consisting of ferrite magnets 30 mounted at uniform intervals over the circumference and of timing magnets 31.

It is expedient to face the coil and magnet ring 25 on its side facing the rim well 4 with several layers of magnetically conducting foil in order to shield the magnetic fields of the coils 26, 27 from the rim well 4.

Associated with the coil and magnet ring 25 is the stator 28 already referred to, which is mounted on the body side (on a shock strut, for example). This stator 28 supports the components corresponding to the data transmission coil 26, energy reception coil 27, and the magnetic track (ferrite magnets 30, timing magnets 31). The stator housing itself is also made of a glass fiber reinforced plastic and consists of a base element 33 which is adapted to the rim well profile, that is, its shape is that of a round arch, and is surmounted by a cover 34. A reception coil 35 for data transmission, an electronic board 36 with integrated Hall sensors (four angle sensors 37 mounted in series at equal intervals and an adjacent timing sensor 41 for zero marking and recognition of the direction of wheel rotation), and a transmission coil 38 with coil core 39 are fastened in succession on the base element 33 for energy transmission to the electronic unit 18. These units are connected by a common data/energy cable 40 to the test value acquisition and processing system on the vehicle side.

An open conducting loop may be employed as an alternative in the coil and magnet ring 25 in place of the data transmission coil 26 on the wheel side. In this instance the reception coil 35 would be replaced by a miniature spool and a preamplifier in the stator 28.

Energy is transmitted over inductively coupled resonance circuits, the operating frequency being around 50 kHz. The distance reache between stator 28 and coil and magnet ring 25 may range from 0 to 5 mm. transmission coil 38 and energy reception coil 27 should have taps for adaptation of a generator or power consuming device. Data are also transmitted over inductively coupled resonance circuits; the magnetic fields in energy and data transmission may be oriented in different directions in space. This can be accomplished by means of a symmetrical winding structure for the transmission coil 38 and energy reception coil 27 in energy transmission and winding in the opposite direction for the transmission coil 38 and energy reception coil 27 in data transmission. There is consequently little input of energy transmission into data transmission.

The four angle sensors 37 are mounted in an arc spaced at angles of 2.5° in the base element 33 of the stator. They detect the field of 180 ferrite magnets 30 cemented at intervals of 2° on the magnetic track. This yields a wheel rotation angle resolution of 0.5°, since an angle sensor 37 is aligned with a ferrite magnet 30 after every 0.5° of rotation. The timing sensor 41 recognizes three timing magnets 31 mounted beside the ferrite magnets 30. The sensor signals are evaluated in an electronic angle measurement unit which is part of the test value acquisition and processing system on the vehicle side. In this unit a counter counts incrementally upward and downward, depending on the direction of travel.

As a result of application of the measuring wheel 2 claimed for the invention, an energy and data transmission system projecting beyond the lateral profile of a vehicle and the support frame such a system requires may be dispensed with.

Hence no road traffic hazard is created.

We claim:

1. A vehicle measuring wheel for detection of forces and moments between a rim of said vehicle measuring wheel and a vehicular axles, said vehicle wheel comprising:

a plurality of force transducers for generating energy and data signals mounted between a rim face and a wheel flange of said vehicle measuring wheel;

signal coupling means coupled to said vehicle wheel and said plurality of force transducers for transmitting and receiving said energy and data signals; and a test value acquisition and processing system for transmitting and receiving test values and said energy and data signals and for processing said test values and said energy and data signals, said system being disposed within a vehicle upon which said vehicle measuring wheel is coupled and coupled to said vehicle measuring wheel, wherein at least one of said wheel flange and said rim face comprises a fiber reinforced material and said signal coupling means is mounted along the circumference of a rim well disposed within said measuring wheel.

2. A vehicle measuring wheel as claimed in claim 1, wherein said rim face is fitted upon a plurality of connection points disposed upon said measuring wheel by means of ribs, said ribs securing said rim face against axial and radial displacements.

3. A vehicle measuring wheel as claimed in claim 1, wherein said wheel flange further comprises:

a bevelled edge; and a central cup wherein said bevelled edge forms, in cooperation with said rim face a plurality of cavities for receiving said plurality of force transducers, said plurality of force transducers for measuring relative forces between said wheel flange and said rim face, said central cup for receiving an electronic unit.

4. A vehicle measuring wheel as claimed in claim 3, wherein said wheel flange is of a modified square shape, with inward curving openings made upon the sides of said modified square shape, said inward curving openings coinciding with open areas in said rim face for effecting heat removal outward from inside said vehicle measuring wheel.

5. A vehicle measuring wheel as claimed in claim 3, wherein said wheel flange is further connected to said vehicular axle by screw connections located in a bottom face of said central cup and further comprises a thermal insulating washer inserted between said vehicular axle and said bottom face of said central cup.

6. A vehicle measuring wheel as claimed in claim 3, wherein said plurality of force transducers further comprises four force transducers distributed evenly over the circumference of said measuring wheel and disposed within said plurality of cavities, said force transducers being connected to said wheel flange and said rim face by means of screw connections.

7. A vehicle measuring wheel as claimed in claim 6, wherein said force transducers are coupled to said electronic unit by means of a first cable assembly, said force transducers for generating orthogonal force signals in the x, y, and z directions and communicating said force signals to said electronic unit by means of said first cable assembly.

8. A vehicle measuring wheel as claimed in claim 1, said signal coupling means further comprises a coil and magnet ring cemented on the inner side of a rim well said coil and magnet ring extending over the circumference of said rim well, said coil and magnet ring further comprising a plurality of data transmission coils and a plurality of energy reception coils and a magnetic track for determining the angular position and zero marking of rotation of said vehicle measuring wheel.

9. A vehicle measuring wheel as claimed in claim 8, wherein said coil and magnet ring further comprises a plurality of layers of magnetically conducting foil disposed between said rim well and said coil and magnet ring for shielding said rim well from magnetic fields emanating from said plurality of data transmission coils and said plurality of energy reception coils.

10. A vehicle measuring wheel as claimed in claim 8, wherein said vehicular axle further comprises a stator disposed in proximity to said coil and magnet ring comprising a first complimentary element coupled to said stator for communicating with said plurality of data transmission coils, a second complimentary element coupled to said stator for communicating with said plurality of energy reception coils, and a third complimentary element coupled to said stator for communicating with said magnetic track said stator connected to said test value acquisition and processing system by means of a second cable assembly.

11. A vehicle measuring wheel as claimed in claim 10, wherein said first complimentary element further comprises a reception coil coupled to said stator for communicating data between said stator and said coil and magnet ring, said second complimentary element further comprises a transmission coil for communicating energy to said electronic unit between said stator and said coil and magnet ring, and said third complimentary element further comprises Hall effect sensors coupled to said stator for sensing moving magnetic fields corresponding to rotation of said coil and magnet ring.

12. A vehicle measuring wheel as claimed in claim 11, wherein said first complimentary element comprises a first wound coil and said second complimentary element comprises a second wound coil, wherein said first and second coils are wound in opposite directions, and said plurality of data transmission coils and said plurality of energy reception coils comprise windings wound in opposite directions such that the resulting magnetic fields for energy and data transmission respectively are oriented in different directions in space.

13. A vehicle measuring wheel as claimed in claim 11, wherein said third complimentary element further comprises four angle sensors mounted in an arc at intervals of 2.5° on said stator, said angle sensors for communicating with said magnet track, said magnet track further comprising 180 ferrite magnets cemented to said coil and magnet ring at intervals of 2°.

14. A vehicle measuring wheel as claimed in claim 1 wherein at least one of said wheel flange and rim face further comprise and said coil and magnet ring further comprises.

* * * * *